(No Model.)

F. E. CROSS.
DIVIDED PULLEY.

No. 328,386.   Patented Oct. 13, 1885.

Witnesses:
J. H. Shumway.
Jos. F. Earle.

Frederick E. Cross
Inventor
By atty.

UNITED STATES PATENT OFFICE.

FREDERICK E. CROSS, OF WATERBURY, CONNECTICUT.

DIVIDED PULLEY.

SPECIFICATION forming part of Letters Patent No. 328,386, dated October 13, 1885.

Application filed March 23, 1885. Serial No. 159,717. (No model.)

*To all whom it may concern:*

Be it known that I, FREDERICK E. CROSS, of Waterbury, in the county of New Haven and State of Connecticut, have invented a new Improvement in Divided Pulleys; and I do hereby declare the following, when taken in connection with accompanying drawings, and the letters of reference marked thereon, to be a full, clear, and exact description of the same, and which said drawings constitute part of this specification, and represent, in—

Figure 1:
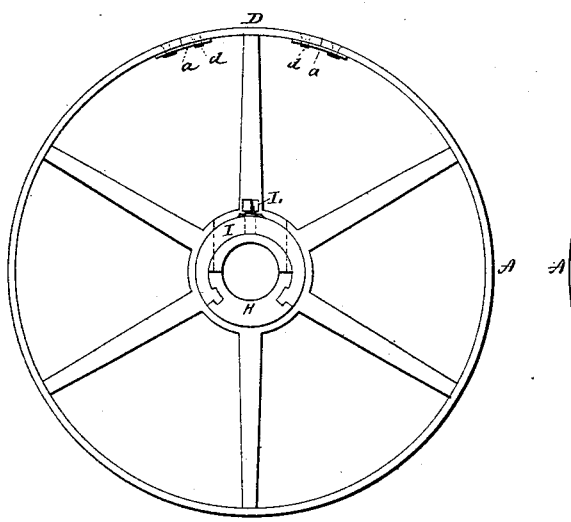
Figure 2:
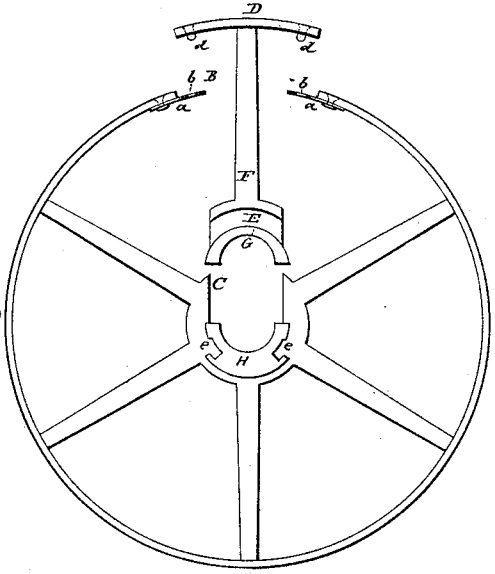
Figure 3:
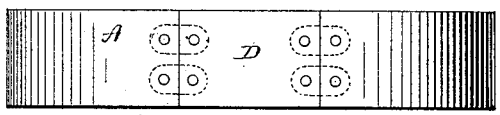
Figure 4:
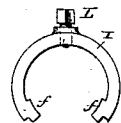

Figure 1, a side view of the pulley complete; Fig. 2, a side view showing the detached portion, as in the act of introduction or removal; Fig. 3, a face view of the pulley complete; Fig. 4, the yoke detached.

This invention relates to an improvement in that class of pulleys which are constructed to be applied to shafting without taking the shafting from its bearings, and such as are made in parts to be bolted together around the shaft, and commonly called "divided pulleys."

In the usual construction of this class of pulleys they are divided diametrically into two equal parts, and then placed the two parts respectively on opposite sides of the shaft and the two parts bolted together. In placing such a pulley upon the shaft, unless the pulley be extremely small, two persons are necessary, for the reason that both parts require to be supported, as the shaft cannot of itself afford much assistance in supporting the parts until they are bolted together.

The object of my invention is to construct a pulley which may be readily applied without the necessity of a second person; and the invention consists in a pulley having an opening transversely through its rim, broader than the diameter of the shaft, and corresponding opening into the hub, combined with a segment corresponding to the opening in the rim and segment corresponding to the opening into the hub, the two segments connected by an arm, said segments and arm removable from the body of the pulley for the application of the pulley to the shaft, and then replaced after the pulley is upon the shaft to complete the pulley, as more fully hereinafter described.

In constructing the pulley the rim A is made continuous, except as to a small segment in a position of one of the arms. At that point, B, an opening is made somewhat larger than the diameter of the shaft to which the pulley is to be applied. On the same diametrical line a portion of the hub is cut away, as at C, opening into the hole through the pulley, the opening being a little broader than the diameter of the shaft. This constitutes the principal part or body of the pulley.

The removable or detachable part is made with a segment, D, of the rim corresponding to the opening B, so that the segment D may set into the opening B.

At the center or hub a segment, E, is made corresponding to the recess C in the hub, and from the segment D of the rim to the segment of the hub an arm, F, extends, corresponding to the other arms of the pulley, thus making a segment of the rim, a segment of the hub, and one of the arms in a piece detachable from the body of the pulley.

On the segment E a portion, G, of the hub is also cast, corresponding to the remaining portion of the hub H on the other part, the division in the hub being at the center, and so that when set together the hub will be complete, as seen in Fig. 1, the one part taking a bearing upon the other.

To form a support for the segment of the rim, the main part of the rim is provided with a flange, *a*, at each end of the opening, and upon which the segment D may rest, and each of these flanges may be provided with an opening, *b*, and the segment D with corresponding studs, *d*, which will enter the openings *b* when set together, as in Fig. 1. As a means for locking the two parts together when on the shaft, I construct the one part of the hub H with notches *e*, into which two lugs, *f*, on a yoke, I, may set, as seen in Fig. 1, the yoke passing over the removable portion G of the hub, and the yoke provided with a clamping-screw, L, to bear upon the part G of the hub, and so as to bind the two parts firmly together. A like yoke may be applied at each end of the hub, as seen in Fig. 3. Any suitable clamping device, however, which will bind the two parts together will serve the purpose, it only being essential that they shall be provided with some means for securing them together when upon the shaft.

To place the pulley upon the shaft the segment is detached, then the body of the pulley set over the shaft from above, the opening permitting the pulley to pass down until it rests upon the shaft, then the segment is replaced and clamped in position, which completes the pulley.

The studs $d$ on the segment enter the corresponding holes $b$ in the flanges, and thus interlock with the two ends of the rim to prevent the separation or vibration.

When the pulley is applied to the shaft, it is secured by means of the clamping device, as shown, or it may be secured in any of the known methods of securing the pulley to a shaft.

I claim—

1. A pulley constructed with a recess in its rim, and corresponding recess in the hub, and parallel with the axis of the pulley, the width of said recesses greater than the diameter of the shaft to which the pulley is to be applied, combined with a segment corresponding to the recess in the rim and a segment corresponding to the recess in the hub, the said two segments connected by an arm of the pulley, the said two parts adapted to be secured together, substantially as described.

2. A pulley constructed with a recess in its rim, and corresponding recess in the hub, and parallel with the axis of the pulley, the width of said recesses greater than the diameter of the shaft to which the pulley is to be applied, combined with a segment corresponding to the recess in the rim and a segment corresponding to the recess in the hub, the said two segments connected by an arm of the pulley, the rim of the pulley constructed with an underlying flange, $a$, at the ends of the opening, and upon which the segment of the rim will rest, the said parts adapted to be secured together, substantially as described.

3. A pulley constructed with a recess in its rim, and corresponding recess in the hub, and parallel with the axis of the pulley, the width of said recesses greater than the diameter of the shaft to which the pulley is to be applied, combined with a segment corresponding to the recess in the rim and a segment corresponding to the recess in the hub, the said two segments connected by an arm of the pulley, the rim of the pulley constructed with an underlying flange, $a$, at the ends of the opening, and upon which the segment of the rim will rest, the said segment constructed with studs $d$, and the flanges $a$ with corresponding holes to interlock with said studs, the said parts adapted to be secured together, substantially as described.

FREDERICK E. CROSS.

Witnesses:
GREENE KENDRICK,
HERBERT A. STEELE.